J. J. WHEAT.
Salting and Curing Meats.
No. 203,681.　　　　　Patented May 14, 1878.
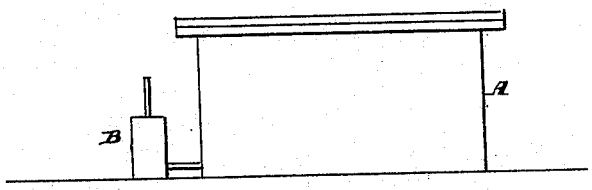
Attest:
P. Benjamin.
George Thom.
Inventor
J. J. Wheat
By his attorney
Charles E. Foster

UNITED STATES PATENT OFFICE.

JOHN J. WHEAT, OF INDIANAPOLIS, INDIANA.

IMPROVEMENT IN SALTING AND CURING MEATS.

Specification forming part of Letters Patent No. 203,681, dated May 14, 1878; application filed March 26, 1878.

*To all whom it may concern:*

Be it known that I, JOHN J. WHEAT, of Indianapolis, Marion county, Indiana, have invented Improvements in Curing Meats, of which the following is a specification:

The object of my invention is an improvement in the process of preserving or curing meats by means of cold solutions.

Heretofore meats have been thus preserved by immersing them in the solutions for a greater or less time, sometimes under pressure, but generally under a vacuum.

A continuous pressure, while it will cause the gradual impregnation of the meat, effects the result so slowly that but little advantage is gained in time over the ordinary process of salting.

A reduction in the time intervening between the killing of the animal and the thorough curing is of more importance than is generally supposed, not only in the matter of expense, but chiefly because, until thoroughly cured, the meat undergoes a gradual process of decomposition, and changes or loses its nutritious elements, to a greater or less degree impairing the quality of the product.

I have discovered that a great proportion of the time may be saved and a better product obtained by maintaining the meat under pressure in the brine, but intermitting and varying the pressure.

I employ any suitable apparatus, consisting generally of a strong metallic receptacle, A, having a removable lid or cover and a force-pump, B, by which brine or antiseptic liquid may be forced into the vessel.

The meat, after being cooled as usual, is placed in the receptacle, which is filled with brine. The pump is then put into operation until the pressure within the receptacle is from sixty to one hundred pounds to the square inch, a pressure of seventy-five pounds being generally preferable. The pressure is maintained from two to five hours, and is then reduced to about twenty pounds, at which it is kept for several hours, when it is again increased to from sixty to one hundred pounds, and so maintained for several hours, and so on until the meat is thoroughly impregnated. This alternate increase and reduction of the pressure results in impregnating the meat in much less time than is possible when the pressure is uniform.

I am aware that in some instances meats have been cured by subjecting them alternately to the effects of pressure and a vacuum; but this, instead of aiding in effecting the desired result, is injurious, as a vacuum always results in the extraction of nutritious matters from the meat.

I claim—

The process of treating meat herein described—that is, subjecting it to the action of an impregnating fluid under a pressure alternately increased and reduced, but never below atmospheric pressure, as and for the purpose set forth.

In testimony whereof I have signed my name to this specification in the presence of two subscribing witnesses.

J. J. WHEAT.

Witnesses:
C. E. FOSTER,
F. M. GREEN.